United States Patent
Hu et al.

(10) Patent No.: US 10,612,116 B2
(45) Date of Patent: Apr. 7, 2020

(54) INCREASING STRENGTH OF AN ALUMINUM ALLOY

(71) Applicant: GM GLOBAL TECHNOLOGY OPERATIONS LLC, Detroit, MI (US)

(72) Inventors: Bin Hu, Shanghai (CN); Pan Wang, Shanghai (CN); Qi Lu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 15/346,699

(22) Filed: Nov. 8, 2016

(65) Prior Publication Data

US 2018/0127859 A1 May 10, 2018

(51) Int. Cl.
| | | |
|---|---|---|
| *C22F 1/043* | (2006.01) | |
| *C22C 21/02* | (2006.01) | |
| *B22D 17/00* | (2006.01) | |
| *B22D 18/04* | (2006.01) | |
| *B22D 21/00* | (2006.01) | |

(52) U.S. Cl.
CPC .............. *C22F 1/043* (2013.01); *B22D 17/00* (2013.01); *B22D 18/04* (2013.01); *B22D 21/007* (2013.01); *C22C 21/02* (2013.01); *B60B 2360/104* (2013.01)

(58) Field of Classification Search
None
See application file for complete search history.

(56) References Cited

U.S. PATENT DOCUMENTS

| | | | |
|---|---|---|---|
| 1,945,297 A | 1/1934 | Sterner-Rainer | |
| 5,948,185 A | 9/1999 | Krajewski et al. | |
| 5,993,576 A * | 11/1999 | Ichinose ................. | C22C 21/04 148/439 |
| 6,045,636 A | 4/2000 | Krajewski | |

(Continued)

FOREIGN PATENT DOCUMENTS

| | | |
|---|---|---|
| CN | 102312135 A | 1/2012 |
| CN | 108070754 A | 5/2018 |

(Continued)

OTHER PUBLICATIONS

Machine English translation of JP 07-109537, Hashimoto Akio et al., Apr. 25, 1995.*

(Continued)

*Primary Examiner* — Colleen P Dunn
*Assistant Examiner* — Anthony M Liang
(74) *Attorney, Agent, or Firm* — Harness, Dickey & Pierce, P.L.C.

(57) ABSTRACT

In an example of a method for increasing strength of an aluminum alloy, the aluminum alloy is formed in a molten state. The aluminum alloy includes from about 4 wt % to about 11 wt % silicon, from greater than 0.2 wt % to about 0.5 wt % chromium, from about 0.1 wt % to about 0.5 wt % magnesium, from about 0.01 wt % to about 0.1 wt % titanium, equal to or less than about 0.5 wt % iron, equal to or less than about 0.5 wt % manganese, and a balance of aluminum. The aluminum alloy is subjected to a solution heat treatment. The aluminum alloy is quenched, and the aluminum alloy is age hardened at an age hardening temperature ranging from about 140° C. to 175° C. for a time period ranging from about 3 hours to about 35 hours.

11 Claims, 1 Drawing Sheet

(56) References Cited

U.S. PATENT DOCUMENTS

| | | |
|---|---|---|
| 6,811,625 B2 | 11/2004 | Verma |
| 7,216,927 B2 | 5/2007 | Luo et al. |
| 8,163,113 B2 | 4/2012 | Mishra et al. |
| 8,287,966 B2 | 10/2012 | Sundarraj et al. |
| 8,327,910 B2 | 12/2012 | Walker et al. |
| 8,708,425 B2 | 4/2014 | Carlson et al. |
| 8,758,529 B2 | 6/2014 | Wang et al. |
| 8,852,359 B2 | 10/2014 | Walker et al. |
| 8,889,226 B2 | 11/2014 | Walker et al. |
| 8,992,696 B2 | 3/2015 | Walker et al. |
| 9,593,396 B2 | 3/2017 | Luo et al. |
| 9,700,976 B2 | 7/2017 | Gao et al. |
| 9,771,635 B2 | 9/2017 | Wang et al. |
| 2008/0096039 A1 | 4/2008 | Sachdev et al. |
| 2009/0071620 A1 | 3/2009 | Bharadwaj et al. |
| 2011/0286880 A1 | 11/2011 | Luo et al. |
| 2012/0273539 A1 | 11/2012 | Carter |
| 2014/0234160 A1 | 8/2014 | Mueller et al. |

FOREIGN PATENT DOCUMENTS

| | | | |
|---|---|---|---|
| DE | 102010055444 A1 | 6/2012 | |
| DE | 102017125971 A1 | 5/2018 | |
| EP | 1975262 A2 * | 10/2008 | ............. C22C 21/02 |
| EP | 2281909 | 2/2011 | |

OTHER PUBLICATIONS

"Introduction." Corrosion of Aluminum and Aluminum Alloys, by Joseph R. Davis, ASM International, 2000, p. 19. (Year: 2000).*

First Office Action for Chinese Patent Application No. 201711062801.0 dated Apr. 15, 2019 with English language machine translation, 10 pages.

* cited by examiner

INCREASING STRENGTH OF AN ALUMINUM ALLOY

TECHNICAL FIELD

The present disclosure relates generally to increasing the strength of an aluminum alloy.

BACKGROUND

Die casting processes are commonly used to form high volume automobile components. In particular, aluminum alloys are often used to form the structural components in the die casting process because aluminum alloys have many favorable properties, such as light weight and high dimensional stability, which allow the formation of more complex and thin wall components compared to other alloys. Traditionally, aluminum die castings have a limitation on ductility due to air entrapment and the formation of iron (Fe)-intermetallic phases. Many technologies developed for reducing these issues, such as semisolid die casting and super-vacuum die casting, form porosity-free castings.

SUMMARY

In an example of a method for increasing strength of an aluminum alloy, the aluminum alloy is formed in a molten state. The aluminum alloy includes from about 4 wt % to about 11 wt % silicon, from greater than 0.2 wt % to about 0.5 wt % chromium, from about 0.1 wt % to about 0.5 wt % magnesium, from about 0.01 wt % to about 0.1 wt % titanium, equal to or less than about 0.5 wt % iron, equal to or less than about 0.5 wt % manganese, and a balance of aluminum. The aluminum alloy is subjected to a solution heat treatment. The aluminum alloy is quenched, and the aluminum alloy is age hardened at an age hardening temperature ranging from about 140° C. to 175° C. for a time period ranging from about 3 hours to about 35 hours.

In an example of a method for forming a vehicle body or a powertrain component, an aluminum alloy is formed in a molten state. The aluminum alloy includes from about 4 wt % to about 11 wt % silicon, from greater than 0.2 wt % to about 0.5 wt % chromium, from about 0.1 wt % to about 0.5 wt % magnesium, from about 0.01 wt % to about 0.1 wt % titanium, equal to or less than about 0.5 wt % iron, equal to or less than about 0.5 wt % manganese, and a balance of aluminum. The aluminum alloy is cast by a high pressure die-cast process to form a cast structure. The cast structure is the vehicle body or the powertrain component. The cast structure is subjected to a solution heat treatment. The cast structure is quenched, and the cast structure is age hardened at an age hardening temperature ranging from about 140° C. to 175° C. for a time period ranging from about 3 hours to about 35 hours.

An example of an alloy disclosed herein includes a bulk composition and precipitates formed in the bulk composition. The bulk composition includes from about 4 wt % to about 11 wt % silicon, from greater than 0.1 wt % to about 0.5 wt % chromium, from about 0.1 wt % to about 0.5 wt % magnesium, from about 0.01 wt % to about 0.1 wt % titanium, equal to or less than about 0.5 wt % iron, equal to or less than about 0.5 wt % manganese, and a balance of aluminum. The precipitates include some of the silicon, some of the chromium, and some of the iron, and have a particle size equal to or less than about 100 nm.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
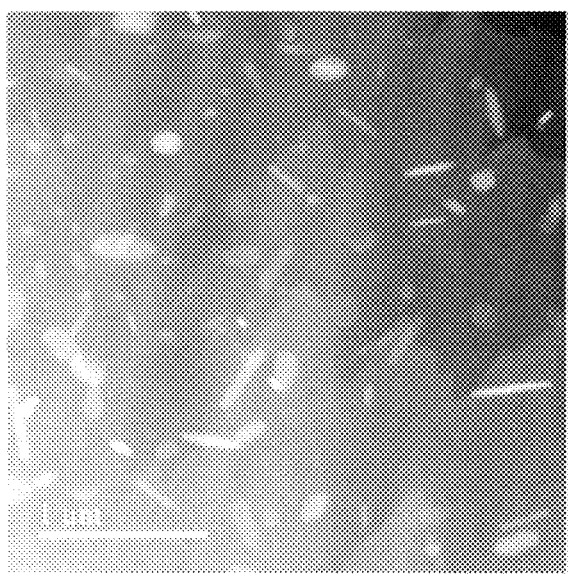
FIG. 1 is a transmission electron microscope (TEM) image, with a 1 μm scale bar, of an aluminum alloy prepared by an example of the method for increasing the strength of an aluminum alloy.

Aluminum alloys often include aluminum, alloying elements (e.g., silicon and iron), and impurities. In the examples of the method disclosed herein, at least some of the alloying elements form precipitates within the bulk materials, and these precipitates can improve the strength of die castings formed from the aluminum alloy. In an example, the tensile strength of the aluminum alloy is enhanced.

The aluminum alloy disclosed herein includes aluminum, silicon, chromium, magnesium, titanium, iron, and manganese in specific amounts. For silicon, the specific amount ranges from about 4 wt % to about 11 wt %. For chromium, the specific amount ranges from greater than 0.2 wt % to about 0.5 wt %, and for iron, the specific amount is equal to or less than about 0.5 wt %. Age hardening the aluminum alloy, which includes the previously mentioned elements in the specific amounts, at an age hardening temperature ranging from about 140° C. to 175° C. for a time period ranging from about 3 hours to about 35 hours improves the strength of the aluminum alloy. The age hardening process may cause the formation of the precipitates in the aluminum alloy. The presence of specific elements in specific amounts may cause the precipitates to have a specific composition, and the age hardening process at a specific temperature and for a specific time period may cause the precipitates to have a specific particle size. While not being bound to any theory, it is believed that the presence of the precipitates improves the strength of the aluminum alloy.

Examples of the method for increasing strength of an aluminum alloy include forming the aluminum alloy in a molten state. As mentioned above, examples of the aluminum alloy composition disclosed herein may include silicon, chromium, magnesium, titanium, iron, manganese, and a balance of aluminum. In some examples, the aluminum alloy composition may include these metals, without any other metals (i.e., the aluminum alloy may consist of these metals). Further, in some examples, the aluminum alloy composition may exclude copper, zinc, zirconium, vanadium, or combinations thereof, or any other non-listed elements. Still further, in another example, the aluminum alloy composition may consist essentially of silicon, chromium, magnesium, titanium, iron, manganese, and a balance of aluminum. In these instances, other inevitable impurities may be present in the aluminum alloy composition. In some other examples, the aluminum alloy includes additional metals. Examples of these additional element may include strontium, zinc, and/or phosphorous. In another example, the aluminum alloy composition may consist essentially of strontium, zinc, and/or phosphorous in addition to silicon, chromium, magnesium, titanium, iron, manganese, and a balance of aluminum. In these instances, other inevitable impurities may be present in the aluminum alloy composition. Examples of the metals added to the aluminum alloy composition disclosed herein are discussed in greater detail below.

The aluminum alloy includes silicon. Silicon may be added to the aluminum alloy composition so that the alloy may have good castability. The presence of silicon in the aluminum alloy may reduce the melting temperature of aluminum and improve the fluidity of the molten aluminum. In an example, the silicon may be present in the aluminum alloy composition in an amount ranging from about 4 wt % to about 11 wt % based on the total wt % of the aluminum alloy composition. In another example, the silicon may be present in an amount ranging from about 4.5 wt % to about 5.5 wt % (based on the total wt % of the aluminum alloy composition).

The aluminum alloy further includes chromium. The specific amount of chromium may contribute to the formation of the precipitates that strengthen the aluminum alloy. Chromium may also be added to reduce die soldering in die casting and squeeze casting processes by reducing the solubility of iron in the aluminum alloy melt. In an example, chromium may be present in the alloy composition in an amount ranging from greater than 0.2 wt % to about 0.5 wt % based on the total wt % of the aluminum alloy composition. In another example, the chromium may be present in an amount ranging from about 0.25 wt % to about 0.35 wt % (based on the total wt % of the aluminum alloy composition).

The aluminum alloy further includes magnesium. Magnesium improves the yield strength by solid solution strengthening. Magnesium may be present in an amount ranging from about 0.1 wt % to about 0.5 wt % based on the total wt % of the aluminum alloy composition. In another example, the magnesium may be present in an amount ranging from about 0.2 wt % to about 0.5 wt % (based on the total wt % of the aluminum alloy composition). Still further, in another example, the magnesium may be present in an amount of about 0.3 wt % (based on the total wt % of the aluminum alloy composition).

The aluminum alloy also includes titanium. Titanium may be added as a grain refiner to improve the control of the grain growth of the molten aluminum during the die casting process. In an example, the titanium may be present in an amount ranging from about 0.01 wt % to about 0.1 wt % based on the total wt % of the aluminum alloy composition. In another example, the titanium may be present in an amount ranging from about 0.05 wt % to about 0.1 wt % (based on the total wt % of the aluminum alloy composition).

The aluminum alloy may also include iron. In traditional aluminum alloys, iron is an impurity. However, in the aluminum alloy disclosed herein, a small amount of iron is added to contribute to the precipitation with chromium and iron, and thus to the formation of the precipitates that strengthen the aluminum alloy. Iron may also be included to improve yield strength or for ductility. In an example, the iron may be present in an amount equal to or less than 0.5 wt % based on the total wt % of the alloy composition. In another example, the iron may be present in an amount of equal to or less than 0.15 wt % of the alloy composition. In some examples, the wt % of iron is greater than 0 wt %, and thus at least some iron is present in the aluminum alloy composition.

Additionally, the aluminum alloy may include manganese. In an example, the manganese may be present in an amount equal to or less than 0.5 wt % based on the total wt % of the aluminum alloy composition. In another example, the manganese may be present in an amount of equal to or less than 0.2 wt % of the aluminum alloy composition. In yet another example, the manganese may be present in an amount of equal to or less than 0.15 wt % of the aluminum alloy composition. In some examples, the wt % of manganese is greater than 0 wt %, and thus at least some manganese is present in the aluminum alloy composition.

As mentioned above, the aluminum alloy may also include strontium, zinc, and/or phosphorous. Strontium may be included in the aluminum alloy as a modifier for eutectic silicon. Zinc and/or phosphorous may be impurities in the aluminum alloy. In an example, the aluminum alloy includes from about 0.01 wt % to about 0.015 wt % strontium (based on the total wt % of the aluminum alloy composition). In another example, the aluminum alloy includes less than about 0.01 wt % zinc (based on the total wt % of the aluminum alloy composition). In still another example, the aluminum alloy includes less than about 0.003 wt % phosphorous (based on the total wt % of the aluminum alloy composition).

The remainder of the aluminum alloy includes a balance of aluminum. In an example, the aluminum starting material used to form the aluminum in the alloy composition may be 99.9% pure aluminum with less than 0.1 wt % of impurities. The impurities present in the aluminum starting material may include iron, manganese, chromium, vanadium, silicon, or the like.

In one example, the aluminum alloy composition includes the silicon present in an amount ranging from about 4.5 wt % to about 5.5 wt %, the chromium present in an amount ranging from about 0.25 wt % to about 0.35 wt %, the magnesium present in an amount ranging from about 0.1 wt % to about 0.5 wt %, the titanium present in an amount ranging from about 0.05 wt % to about 0.1 wt %, the iron in an amount equal to or less than 0.15 wt %, the manganese in an amount equal to or less than 0.5 wt %, and a balance of aluminum (based on the total wt % of the aluminum alloy composition). This example alloy, may achieve, after age hardening, a tensile strength ranging from about 150 MPa to about 350 MPa or a tensile strength ranging from about 250 MPa to about 350 MPa.

As discussed above, the alloy composition may be selected to affect the composition of the precipitates formed during age hardening. Once the desired alloy composition components are selected, the alloy composition may be formed. The alloy composition may be formed by adding the alloying elements into a pure aluminum melt. The method may also involve known techniques for controlling the impurity levels.

Examples of the method for increasing the strength of the aluminum alloy also include subjecting the aluminum alloy to a solution heat treatment. The solution heat treatment causes the dissolution of the soluble phases in the aluminum alloy. In an example, the solution heat treatment of the aluminum alloy occurs at a solution heat treatment temperature ranging from about 510° C. to about 570° C. In another example, the aluminum alloy may be kept at the solution heat treatment temperature for a time period ranging from about 4 hours to about 12 hours.

Examples of the method for increasing the strength of the aluminum alloy also include quenching the aluminum alloy. During quenching, the temperature of the aluminum alloy is reduced, and aluminum alloy becomes a supersaturated solution. In an example, quenching of the aluminum alloy occurs at a quenching temperature ranging from about 50° C. to about 90° C. The aluminum alloy may be quickly brought from the solution heat treatment temperature to the quenching temperature (e.g., in less than 5 seconds). In an example, the aluminum alloy is brought from the solution heat treatment temperature to the quenching temperature by submerging the aluminum alloy in water, where the water temperature is the same as or about the same as the quenching temperature. In an example, the aluminum alloy is not held at the quenching temperature. In this example, the aluminum alloy may be removed from the water (if water is used to quench the aluminum alloy) and age hardened as soon as the aluminum alloy achieves the quenching temperature.

Examples of the method for increasing the strength of the aluminum alloy also include age hardening the aluminum alloy. As mentioned above, the age hardening process disclosed herein may cause the precipitates to form in the aluminum alloy. The temperature at which the aluminum alloy is age hardened and the length of time for which the aluminum alloy is age hardened may cause the precipitates to have a specific particle size. While not being bound to any theory, it is believed that these precipitates may be responsible for the increase in strength of the aluminum alloy. In one example, after the age hardening, the aluminum alloy has a tensile strength ranging from about 150 MPa to about 350 MPa. In another example, after the age hardening, the aluminum alloy has a tensile strength ranging from about 250 MPa to about 350 MPa.

The precipitates may contain any element contained in the aluminum alloy composition. In some examples, the precipitates include chromium, iron, silicon, or a combination thereof. In other examples, the precipitates may include other elements, such as, e.g., the other element that are included in the aluminum alloy and/or impurities that are present in the aluminum alloy.

The precipitates may be made up of similarly sized particles or differently sized particles. "Particle size", as used herein with regard to the precipitates, refers to the diameter of a substantially spherical particle (i.e., a spherical or near-spherical particle having a sphericity of >0.84), or the average diameter of a non-spherical particle (i.e., the average of multiple diameters across the particle). The particle size of the precipitates may affect the strength of the aluminum alloy. In an example, the precipitates have a particle size (or an average particle size) equal to or less than about 100 nm. In another example, the precipitates have a particle size (or an average particle size) of about 50 nm. When the aluminum alloy contains precipitates having a particle size equal to or less than about 100 nm and/or an average particle size of about 50 nm, the aluminum alloy may achieve a tensile strength ranging from about 150 MPa to about 350 MPa or a tensile strength ranging from about 250 MPa to about 350 MPa.

To form the precipitates, the aluminum alloy may be age hardened at an age hardening temperature ranging from about 140° C. to 175° C. for a time period ranging from about 3 hours to about 35 hours. In another example, the aluminum alloy may be age hardened at an age hardening temperature ranging from about 170° C. to 175° C. for a time period ranging from about 3 hours to about 15 hours. In still another example, the aluminum alloy may be age hardened at an age hardening temperature of 175° C. for a time period of about 6 hours. The aluminum alloy may be quickly brought from the quenching temperature to the age hardening temperature (e.g., in less than 5 seconds). In an example, the age hardening is a solid solution strengthening process. For example, the aluminum alloy may be brought from the quenching temperature to the age hardening temperature by submerging the aluminum alloy in water, where the water temperature is the same as or about the same as the age hardening temperature.

In some examples, selecting a higher age hardening temperature is paired with selecting a lower time period (e.g., age hardening at an age hardening temperature of 175° C. for a time period of about 5.5 hours). In some other examples, selecting a lower age hardening temperature is paired with selecting a higher time period (e.g., age hardening at an age hardening temperature of about 150° C. for a time period of about 27 hours). In still some other examples, any age hardening temperature within the range of about 140° C. to 175° C. may be selected and paired with any time period within the range of about 3 hours to about 35 hours.

In an example, the method for increasing the strength of the aluminum alloy is performed as it has been described above. In this example, the aluminum alloy is formed in the molten state, then the aluminum alloy is subjected to the solution heat treatment, then the aluminum alloy is quenched, then the aluminum alloy is age hardened.

Examples of the method for increasing the strength of the aluminum alloy may also include casting the aluminum alloy to form a cast structure. In an example, the aluminum alloy is cast after being formed in the molten state and prior to being subjected to the solution heat treatment, quenched, and age hardened. In an example, the molten alloy composition disclosed herein is die cast to form a structural casting or cast structure.

The die casting process used to make a casting from the alloy composition may be a high-pressure die casting (HPDC) process, or a low-pressure die casting process, or a gravity casting process, or a squeeze casting (or liquid forging) process. A dosing furnace with a degassing system may be used to hold and transfer the aluminum-based melt (i.e., molten alloy composition) to the die casting machine. The die casting process parameters may be varied, depending upon the die casting machine that is used, the size and/or shape of the casting, etc.

The structural casting or cast structure may be a thick-wall casting, such as shock tower, door inner, or the like. In an example, a thick-wall casting has a cross-sectional thickness ranging from about 3 mm to about 5 mm.

After the alloy composition solidifies to form the structural casting or cast structure, the structural casting or cast structure may be removed from the die. In an example, the casting is ejected from the die. In some examples, the casting is removed using ejector pins. Since soldering is reduced during die casting, little or no scrap casting remains in the die. However, if scrap casting remains, it may be removed from the die. Even though the alloying elements and impurities are controlled, the scrap casting may not be suitable for recycling.

In an example, after the structural casting or cast structure is removed from the die, the structural casting or cast structure is exposed to the solution heat treatment, quenching, and age hardening mentioned above. The final structural casting or cast structure may be an automobile part, a computer part, a communication part, or a consumer electronic part. For examples of the automobile parts, the structural casting or cast structure may be an aluminum-based part for the body of a vehicle, for the powertrain of a vehicle, or an aluminum-based wheel. The final structural casting or cast structure may also be a part utilized in an elevator application.

Examples of the method for forming a vehicle body or a powertrain component include forming the aluminum alloy in a molten state. The aluminum alloy composition may be any composition and may be formed in any way described above in reference to the method for increasing the strength of the aluminum alloy. In an example, the aluminum alloy composition includes the silicon present in an amount ranging from about 4 wt % to about 11 wt %, the chromium present in an amount ranging from greater than 0.2 wt % to about 0.5 wt %, the magnesium present in an amount ranging from about 0.1 wt % to about 0.5 wt %, the titanium present in an amount ranging from about 0.01 wt % to about 0.1 wt %, the iron in an amount equal to or less than 0.5 wt %, the manganese in an amount equal to or less than 0.5 wt %, and a balance of aluminum (based on the total wt % of the aluminum alloy composition).

Examples of the method for forming the vehicle body or the powertrain component also include casting the aluminum alloy to form a cast structure. The aluminum alloy may be cast as described above in reference to the method for increasing the strength of the aluminum alloy (e.g., by high-pressure die casting process, or a low-pressure die casting process, or a squeeze casting process). The structural casting or cast structure formed is the vehicle body or the powertrain component, and may be a thick-wall casting.

Examples of the method for forming the vehicle body or the powertrain component also include subjecting the aluminum alloy to the solution heat treatment, quenching the aluminum alloy, and age hardening the aluminum alloy. The aluminum alloy may be subjected to the solution heat treatment as described above in reference to the method for increasing the strength of the aluminum alloy (e.g., at a solution heat treatment temperature ranging from about 510° C. to about 570° C.). The quenching of the aluminum alloy may be as described above in reference to the method for increasing the strength of the aluminum alloy (e.g., at a quenching temperature ranging from about 50° C. to about 90° C.). The age hardening may also be as described above in reference to the method for increasing the strength of the aluminum alloy (e.g., at an age hardening temperature ranging from about 140° C. to 175° C. for a time period ranging from about 3 hours to about 35 hours) and may cause the formation of the precipitates as described above in reference to the method for increasing the strength of an aluminum alloy (e.g., including chromium, iron, silicon, or a combination thereof, and having a particle size equal to or less than about 100 nm).

In an example, the method for forming the vehicle body or the powertrain component is performed as it has been described above. In this example, the aluminum alloy is formed in the molten state, then the aluminum alloy is cast by a high pressure die-cast process, a low-pressure die casting process, or a squeeze casting process to form a cast structure, then the cast structure is subjected to the solution heat treatment, then the cast structure is quenched, and then the cast structure is age hardened.

In an example, the vehicle body or the powertrain component formed by the method has a tensile strength ranging from about 150 MPa to about 350 MPa. In another example, the vehicle body or the powertrain component formed by the method has a tensile strength ranging from about 250 MPa to about 350 MPa.

An example of age hardened alloy disclosed herein includes a bulk composition and precipitates formed in the bulk composition. The bulk composition may be any composition, and may be formed in any way described above in reference to either method. In an example, the bulk composition includes the silicon present in an amount ranging from about 4 wt % to about 11 wt %, the chromium present in an amount ranging from greater than 0.1 wt % (or greater than 0.2 wt %) to about 0.5 wt %, the magnesium present in an amount ranging from about 0.1 wt % to about 0.5 wt %, the titanium present in an amount ranging from about 0.01 wt % to about 0.1 wt %, the iron in an amount equal to or less than 0.5 wt %, the manganese in an amount equal to or less than 0.5 wt %, and a balance of aluminum (based on the total wt % of the aluminum alloy composition). The precipitates include some of the silicon, some of the chromium, and some of the iron, and have a particle size equal to or less than about 100 nm. The precipitates may be formed in the bulk composition during the age hardening process of either example of the methods disclosed herein.

The age hardened alloy may be formed by or according to either method (e.g., forming the alloy in a molten state, casting the alloy, subjecting the alloy or casting to a solution heat treatment, quenching the alloy or casting, and age hardening the alloy or casting).

In an example, the age hardened alloy or casting has a tensile strength ranging from about 150 MPa to 350 MPa based on/as a result of a heat treatment process that includes age hardening at a temperature ranging from about 140° C. to 175° C. for a time period ranging from about 3 hours to about 35 hours. In another example, the age hardened alloy or casting has a tensile strength ranging from about 250 MPa to 350 MPa based on/as a result of a heat treatment process that includes age hardening at a temperature ranging from about 140° C. to 175° C. for a time period ranging from about 3 hours to about 35 hours.

To further illustrate the present disclosure, examples are given herein. It is to be understood that these examples are provided for illustrative purposes and are not to be construed as limiting the scope of the disclosure.

EXAMPLES

Example 1

Several examples of the method for increasing the strength of an aluminum alloy and several comparable example methods were performed. Three aluminum alloy samples containing from about 4 wt % to about 6 wt % silicon, from about 0.2 wt % to about 0.4 wt % chromium, from about 0.1 wt % to about 0.5 wt % magnesium, from about 0.05 wt % to about 0.1 wt % titanium, equal to or less than about 0.15 wt % iron, less than 0.01 wt % zinc, less than 0.003 phosphorous, from about 0.01 wt % to about 0.015 wt % strontium, and a balance of aluminum were prepared.

Each aluminum alloy sample was subjected to a solution heat treatment at a solution heat treatment temperature of 540° C. for a time period ranging from about 3 to about 8 hours. Then each aluminum alloy sample was quenched at a quenching temperature of 80° C. The first aluminum alloy sample was age hardened at an age hardening temperature of 150° C. The second aluminum alloy sample was age hardened at an age hardening temperature of 175° C., and the third aluminum alloy sample was age hardened at an age hardening temperature of 200° C.

The Vickers hardness number (VHN) for each age hardened aluminum alloy sample was determined at several points during the age hardening process (ranging from after 1 hour to after 48 hours). The VHNs were measured using a CSM microhardness tester (CSM Instruments, Needham Heights, Mass.) with a Vickers diamond indenter. The original hardness, the peak aging hardness, and the peak aging time for each of the aluminum alloy samples (identified by its age hardening temperature) is shown in Table 1.

TABLE 1

| Aluminum Alloy Sample | Original Hardness | Peak Aging Hardness | Peak Aging Time (h) |
|---|---|---|---|
| 150° C. | 72.4 | 108 ± 6 | 22 |
| 175° C. | 72.4 | 107 ± 8 | 6 |
| 200° C. | 72.4 | 106 ± 7 | 1 |

While not shown in Table 1, the first and second aluminum alloy samples (i.e., the samples age hardened at 150° C. and 175° C.) had VHNs above 80 after 3 hours to 35 hours of age hardening. As shown in Table 1, the second aluminum alloy sample (i.e., the sample age hardened at 175° C.) had a VHN of about 107 after age hardening for about 6 hours, and the first aluminum alloy sample (i.e., the sample age hardened at 150° C.) had a VHN of about 108 after age hardening for about 22 hours. It is believed that the aluminum alloy samples that were age hardened (according to examples of the method for increasing the strength of an aluminum alloy) at 150° C. or 175° C. for a time period from about 3 hours to about 35 hours are able to form precipitates with a desired particle size (e.g., less than about 100 nm).

FIG. 1 show a transmission electron microscope image of the second aluminum alloy sample (i.e., the sample age hardened at 175° C.) after age hardening for about 6 hours. FIG. 1 shows the precipitates formed in the second aluminum alloy sample by an age hardening process within an example of the method disclosed herein.

It is believed that the comparative methods that age hardened at 200° C. would cause the precipitates to form and grow too quickly. It is believed that alloys containing precipitates with a large particle size (e.g., greater than 100 nm), will be less hard than alloys containing precipitates with a particle size less than about 100 nm. While the third aluminum alloy sample (i.e., the sample age hardened at 200° C.) has a comparable peak aging hardness to those of the first and second aluminum alloy samples (i.e., the samples age hardened at 150° C. and 175° C.) (see Table 1), it is believed that the shorter time will negatively impact the stability of the heat treatment process. The temperature of the furnace used to heat the aluminum alloy samples is not uniform, and a short age hardening time (e.g., 1 hour) may be insufficient to uniformly heat the aluminum alloy samples to a single temperature. If the heating of the aluminum alloy samples is not uniform, residual stress may be introduced into the alloy. Further, age hardening for a shorter time (e.g., 1 hour) and a higher temperature (e.g., 200° C.) may reduce the ductility of the alloy.

It is believed that the comparative methods that age hardened at 150° C. or 175° C. for less than 3 hours did not have enough time to form and grow precipitates, and the comparative methods that age hardened for longer than 35 hours would expensive to use because the amount of time they take.

Example 2

An aluminum alloy was prepared according to an example of the method for increasing the strength of an aluminum alloy. The aluminum alloy contained from about 4 wt % to about 6 wt % silicon, from about 0.2 wt % to about 0.4 wt % chromium, from about 0.3 wt % to about 0.6 wt % magnesium, from about 0.05 wt % to about 0.1 wt % titanium, equal to or less than about 0.15 wt % iron, less than 0.01 wt % zinc, less than 0.003 phosphorous, less than 0.001 wt % strontium, and a balance of aluminum.

Figure 3:
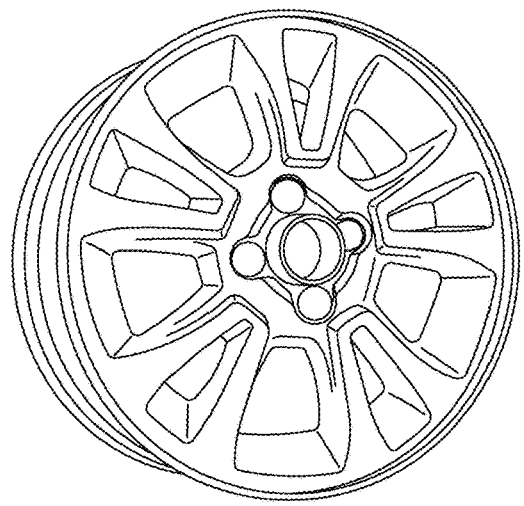
FIG. 3 shows a wheel cast from an aluminum alloy prepared by an example of the method for increasing the strength of an aluminum alloy.

The aluminum alloy was cast by a low-pressure die casting process to form a wheel. Then the aluminum alloy was subjected to a solution heat treatment at a solution heat treatment temperature of 540° C. for a time period ranging from about 3 hours to about 8 hours. The aluminum alloy sample was then quenched in water at a quenching temperature ranging from about 60° C. to about 80° C., and age hardened for 6 hours at an age hardening temperature of 175° C. The wheel cast from the aluminum alloy is shown in FIG. 3.

The yield strength, ultimate tensile strength, and ductility of the cast aluminum alloy were measured by quasi-static tensile testing. The cast aluminum alloy had a yield strength of 270 MPa, an ultimate tensile strength of 310 MPa, and 7% ductility.

Figure 2:
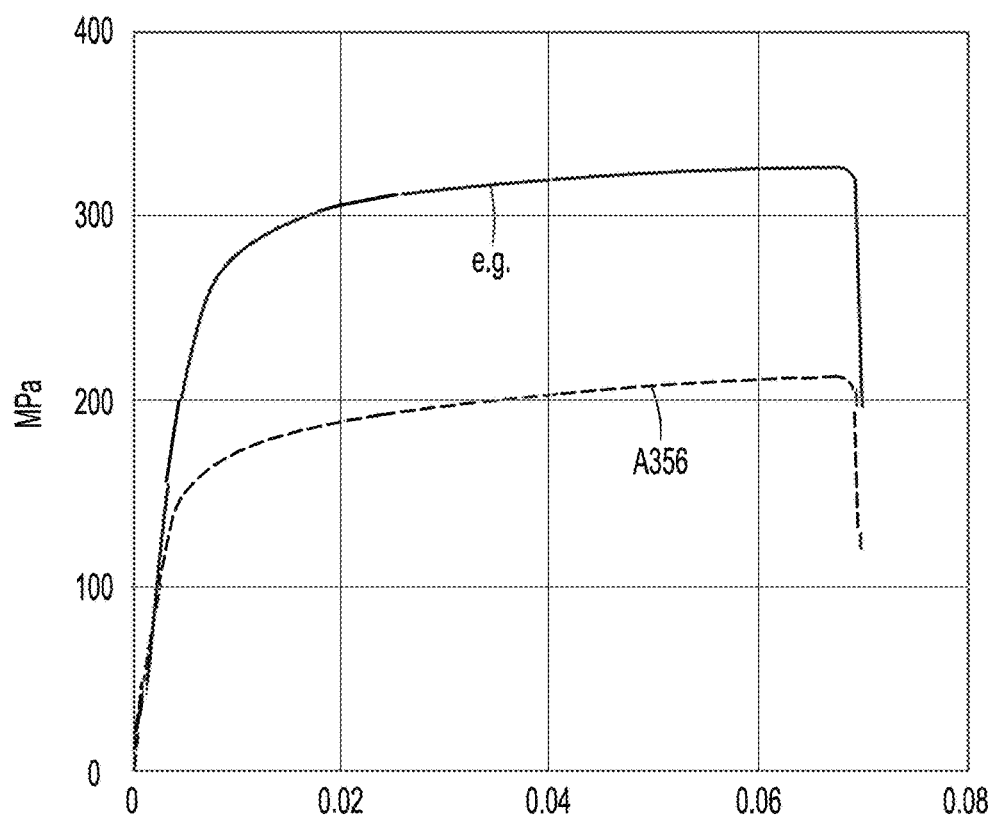
FIG. 2 is a graph depicting the tensile strength of an aluminum alloy prepared by an example of the method for increasing the strength of an aluminum alloy and the tensile strength of an aluminum alloy prepared by a comparative method, where the coordinates are stress (MPa, Y axis) versus strain (Outboard flange, 25 mm gauge length, X axis)

A graph illustrating the tensile strength of the cast aluminum alloy is shown in FIG. 2, where the coordinates are stress (MPa, Y axis) versus strain (Outboard flange, 25 mm gauge length, X axis). FIG. 2 also shows the known tensile strength of the aluminum alloy A356. A356 is an $Al_7Si_{0.35}Mg$ alloy with a yield strength of about 180 MPa, an ultimate tensile strength of about 250 MPa, and 7% ductility. A356 is prepared by low-pressure die casting or a gravity casting process and a subsequent heat treatment process (e.g., solution heat treatment at 535° C. and age hardening at 180° C. for a time period ranging from 4 hours to 8 hours). FIG. 2 shows that the tensile strength of the cast aluminum alloy (labeled "e.g.", formed according to an example of the method for increasing the strength of an aluminum alloy) is greatly improved over the tensile strength of A356. While not shown, the tensile strength of the example cast aluminum alloy is greatly improved over other commercially available cast aluminum wheels (e.g., other cast aluminum wheels having a tensile strength of 150 MPa or 220 MPa). The tensile strength of the cast aluminum alloy (formed according to an example of the method) is about the same as or better than a forged aluminum wheel (e.g., forged aluminum wheels having a tensile strength of 270 MPa or 310 MPa) at a strain of about 7%.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 4 wt % to about 11 wt % should be interpreted to include not only the explicitly recited limits of from about 4 wt % to about 11 wt %, but also to include individual values, such as 4.25 wt %, 5.25 wt %, 8.9 wt %, etc., and sub-ranges, such as from about 4.25 wt % to about 6.50 wt %, from about 5.25 wt % to about 6.50 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for increasing strength of an aluminum alloy, the method comprising:
forming the aluminum alloy in a molten state, the aluminum alloy consisting of:
from 6 wt % to about 11 wt % silicon;
from greater than 0.1 wt % to about 0.5 wt % chromium;
from about 0.1 wt % to about 0.5 wt % magnesium;
from about 0.01 wt % to about 0.1 wt % titanium;
greater than 0 wt % to equal to or less than about 0.5 wt % iron;
from about 0.15 wt % to about 0.5 wt % manganese;
from about 0.01 wt % to about 0.015 wt % strontium:
less than about 0.01 wt % zinc:
less than about 0.003 wt % phosphorous: and
a balance of aluminum;
subjecting the aluminum alloy to a solution heat treatment;
quenching the aluminum alloy; and
age hardening the aluminum alloy at an age hardening temperature ranging from about 140° C. to 175° C. for a time period ranging from about 3 hours to about 35 hours,
wherein after the age hardening, the aluminum alloy has precipitates of silicon, chromium, and iron, the precipitates having a particle size equal to or less than about 100 nm.

2. The method as defined in claim 1 wherein the solution heat treatment occurs at a solution heat treatment temperature ranging from about 510° C. to about 570° C.

3. The method as defined in claim 1 wherein the quenching occurs at a quenching temperature ranging from about 50° C. to about 90° C.

4. The method as defined in claim 1, further comprising casting the aluminum alloy by a high pressure die-cast process, a low-pressure die casting process, a gravity casting process, or a squeeze casting process to form a cast structure.

5. The method as defined in claim 4 wherein the cast structure is a thick-wall casting.

6. The method as defined in claim 1 wherein the aluminum alloy includes:
from about 0.25 wt % to about 0.35 wt % of chromium;
from about 0.05 wt % to about 0.1 wt % of titanium; and
equal to or less than about 0.15 wt % of iron.

7. The method as defined in claim 1 wherein, after the age hardening, the aluminum alloy has a tensile strength ranging from about 150 MPa to about 350 MPa.

8. The method as defined in claim 1 wherein, after the age hardening, the aluminum alloy has a tensile strength ranging from about 250 MPa to about 350 MPa.

9. A method for forming a vehicle body or a powertrain component, the method comprising:
forming an aluminum alloy in a molten state, the aluminum alloy consisting of:
from 6 wt % to about 11 wt % silicon;
from greater than 0.1 wt % to about 0.5 wt % chromium;
from about 0.1 wt % to about 0.5 wt % magnesium;
from about 0.01 wt % to about 0.1 wt % titanium;
greater than 0 wt % to equal to or less than about 0.5 wt % iron;
from about 0.15 wt % to about 0.5 wt % manganese;
from about 0.01 wt % to about 0.015 wt % strontium:
less than about 0.01 wt % zinc;
less than about 0.003 wt % phosphorous; and
a balance of aluminum;
casting the aluminum alloy by a high pressure die-cast process, a low-pressure die casting process, or a squeeze casting process to form a cast structure, the cast structure being the vehicle body or the powertrain component;
subjecting the cast structure to a solution heat treatment;
quenching the cast structure; and
age hardening the cast structure at an age hardening temperature ranging from about 140° C. to 175° C. for a time period ranging from about 3 hours to about 35 hours,
wherein after the age hardening, the aluminum alloy has precipitates of silicon, chromium, and iron, the precipitates having a particle size equal to or less than about 100 nm.

10. An alloy, comprising:
a bulk composition consisting of:
from 6 wt % to about 11 wt % silicon;
from greater than 0.1 wt % to about 0.5 wt % chromium;
from about 0.1 wt % to about 0.5 wt % magnesium;
from about 0.01 wt % to about 0.1 wt % titanium;
greater than 0 wt % to equal to or less than about 0.5 wt % iron;
from about 0.15 wt % to about 0.5 wt % manganese;
from about 0.01 wt % to about 0.015 wt % strontium;
less than about 0.01 wt % zinc;
less than about 0.003 wt % phosphorous; and
a balance of aluminum; and
precipitates formed in the bulk composition, the precipitates including silicon, chromium, and iron, and having a particle size equal to or less than about 100 nm.

11. The alloy as defined in claim 10 wherein the alloy has a tensile strength ranging from about 150 MPa to 350 MPa based on a heat treatment process that includes age hardening at a temperature ranging from about 140° C. to 175° C. for a time period ranging from about 3 hours to about 35 hours.

* * * * *